United States Patent
Tsirkin et al.

(10) Patent No.: US 9,804,876 B2
(45) Date of Patent: Oct. 31, 2017

(54) HYPERVISOR-DRIVEN HIBERNATION

(75) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 242 days.

(21) Appl. No.: 13/407,704

(22) Filed: Feb. 28, 2012

(65) Prior Publication Data

US 2013/0227554 A1    Aug. 29, 2013

(51) Int. Cl.
*G06F 9/455* (2006.01)

(52) U.S. Cl.
CPC ......... *G06F 9/45558* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 2002/0069369 A1* | 6/2002 | Tremain | ............ | H04L 63/0209 726/14 |
| 2002/0083110 A1* | 6/2002 | Kozuch | ............ | G06F 1/3203 718/1 |
| 2005/0268078 A1* | 12/2005 | Zimmer et al. | ............ | 713/1 |
| 2006/0036877 A1* | 2/2006 | Anderson et al. | ............ | 713/300 |
| 2009/0125902 A1* | 5/2009 | Ghosh et al. | ............ | 718/1 |
| 2009/0144579 A1* | 6/2009 | Swanson | ............ | G06F 11/0712 714/3 |
| 2010/0192149 A1* | 7/2010 | Lathrop et al. | ............ | 718/1 |
| 2010/0235557 A1* | 9/2010 | Guo et al. | ............ | 710/260 |
| 2010/0251235 A1* | 9/2010 | Ganguly et al. | ............ | 718/1 |
| 2010/0306560 A1* | 12/2010 | Bozek et al. | ............ | 713/320 |
| 2010/0306764 A1* | 12/2010 | Khanna | ............ | G06F 11/1482 718/1 |
| 2011/0010713 A1* | 1/2011 | Matsumoto et al. | ............ | 718/1 |
| 2011/0173370 A1* | 7/2011 | Jacobs et al. | ............ | 711/6 |
| 2011/0302577 A1* | 12/2011 | Reuther et al. | ............ | 718/1 |
| 2012/0272235 A1* | 10/2012 | Fahrig | ............ | 718/1 |
| 2013/0031341 A1* | 1/2013 | Ganti et al. | ............ | 713/2 |
| 2013/0117359 A1* | 5/2013 | Husain et al. | ............ | 709/203 |
| 2013/0290961 A1* | 10/2013 | De Los Reyes et al. | ........ | 718/1 |

* cited by examiner

*Primary Examiner* — Tammy Lee
(74) *Attorney, Agent, or Firm* — Lowenstein Sandler LLP

(57) ABSTRACT

A system and method for hibernating virtual machines (VMs) are disclosed. In accordance with one embodiment, a computer system that executes a hypervisor and a virtual machine (VM) determines that the virtual machine is to be put to sleep, wherein the determining is performed without involvement of a guest operating system hosted by the virtual machine. In response, the hypervisor stops a first virtual processor of the VM and persists the state of the first virtual processor.

10 Claims, 4 Drawing Sheets

HYPERVISOR-DRIVEN HIBERNATION

TECHNICAL FIELD

This disclosure relates to computer systems, and more particularly, to hibernation in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
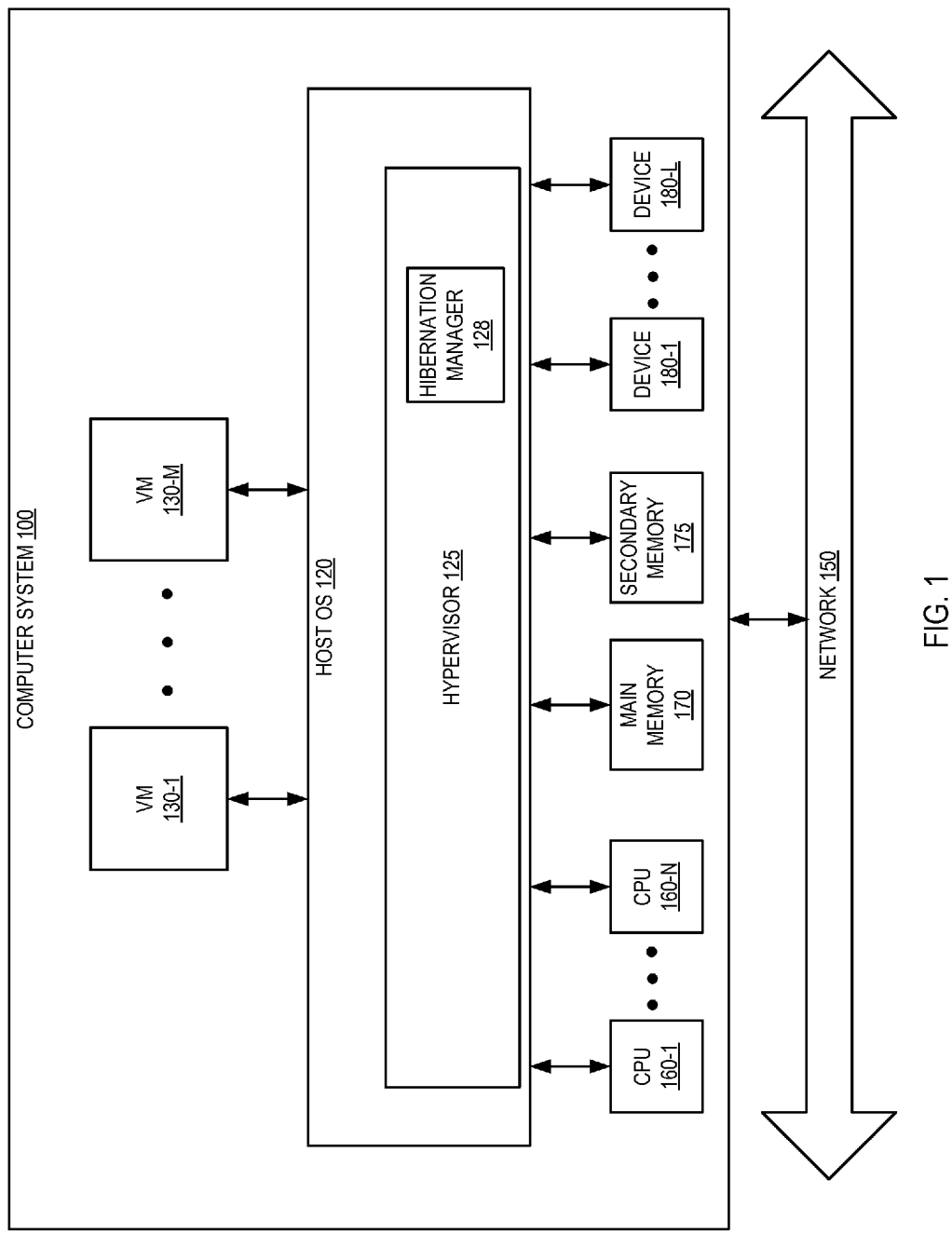
FIG. 1 depicts an exemplary computer system architecture, in accordance with an embodiment of the present invention.

Described herein is a system and method for hibernating virtual machines. Hibernation is a technique by which a physical machine is put to sleep (e.g., in response to a lack of activity, etc.) by the operating system in order to conserve power. Hibernation may involve stopping physical devices (e.g., network interface devices, CD-ROM drives, etc.) of the physical machine (e.g., by changing the devices' states from d0 to d1 or higher, etc.), stopping the central processing units (CPUs) of the physical machine (e.g., by one of the CPUs synchronizing with the other CPUs and all of the CPUs changing states from s0 to s1 or higher, etc.), storing the state of the physical machine to memory (e.g., random access memory [RAM], disk, etc.), and, finally, the operating system suspending itself.

Subsequently, upon receiving a wake event, the operating system wakes the physical machine, which may involve re-starting the CPUs (e.g., by changing the CPUs' states back to s0, etc.), re-starting the physical devices (e.g., by changing the devices' states back to d0, etc.), and loading the state of the physical machine back from memory.

In accordance with embodiments of the present invention, a hypervisor may decide to hibernate one or more virtual machines (VMs). This decision may be made for any number of reasons, such as in response to the occurrence of an external event (e.g., a hardware fault, the arrival of an incoming packet, etc.), due to a lack of activity of a virtual machine, and so forth. The hypervisor then hibernates these virtual machines by stopping the virtual processors and virtual devices of the virtual machines, and persisting (e.g., saving to disk, storing in a non-volatile memory, etc.) the states of the stopped virtual processors.

Subsequently, the hypervisor may decide to wake one or more of the hibernating virtual machines, again for any number of reasons, such as in response to an external event, or after a fixed amount of time has elapsed since a virtual machine first entered hibernation, etc. The hypervisor then wakes the virtual machines by loading the states of the stopped virtual processors, re-starting the virtual processors, re-starting the stopped virtual devices, and, optionally, transmitting to the virtual machines a signal that indicates that the virtual machine has exited a stopped state.

Embodiments of the present invention are thus capable of hibernating individual virtual machines, while other virtual machines on the same host can remain awake. Moreover, embodiments of the present invention can provide greater power savings and lower latency than other existing hibernation methods. Further, because the hypervisor decides when to hibernate virtual machines, rather than the guest operating system (OS), embodiments of the present invention can be used with a guest OS that lacks power management capabilities.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "persisting", "stopping", "re-starting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises one or more central processing units (CPUs) 160, main memory 170, which may include volatile memory devices (e.g., random access memory (RAM)), non-volatile memory devices (e.g., flash memory), and/or other types of memory devices, secondary memory 175 (e.g., one or more hard disk drives, solid-state drives, etc.), and one or more devices 180 (e.g., a network interface device, a CD-ROM drive, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120, which is software that manages the hardware resources of the computer system and that provides functions such as interprocess communication, scheduling, memory management, and so forth. In one embodiment, host operating system 120 also comprises a hypervisor 125, which is software that provides a virtual operating platform for a set of virtual machines (VMs) 130-1 through 130-M and that manages the execution of these virtual machines. In accordance with this embodiment, hypervisor 125 includes a hibernation manager 128 that is capable of hibernating one or more of virtual machines 130-1 through 130-M, as well as determining when it might be advantageous to do so, as described below with respect to FIG. 3. It should be noted that in some alternative embodiments, hypervisor 125 may be external to host OS 120, rather than embedded within host OS 120.

Each virtual machine (VM) 130 is a software implementation of a machine that executes programs as though it were an actual physical machine. Virtual machine (VM) 130 is described in more detail below with respect to FIG. 2.

Figure 2:
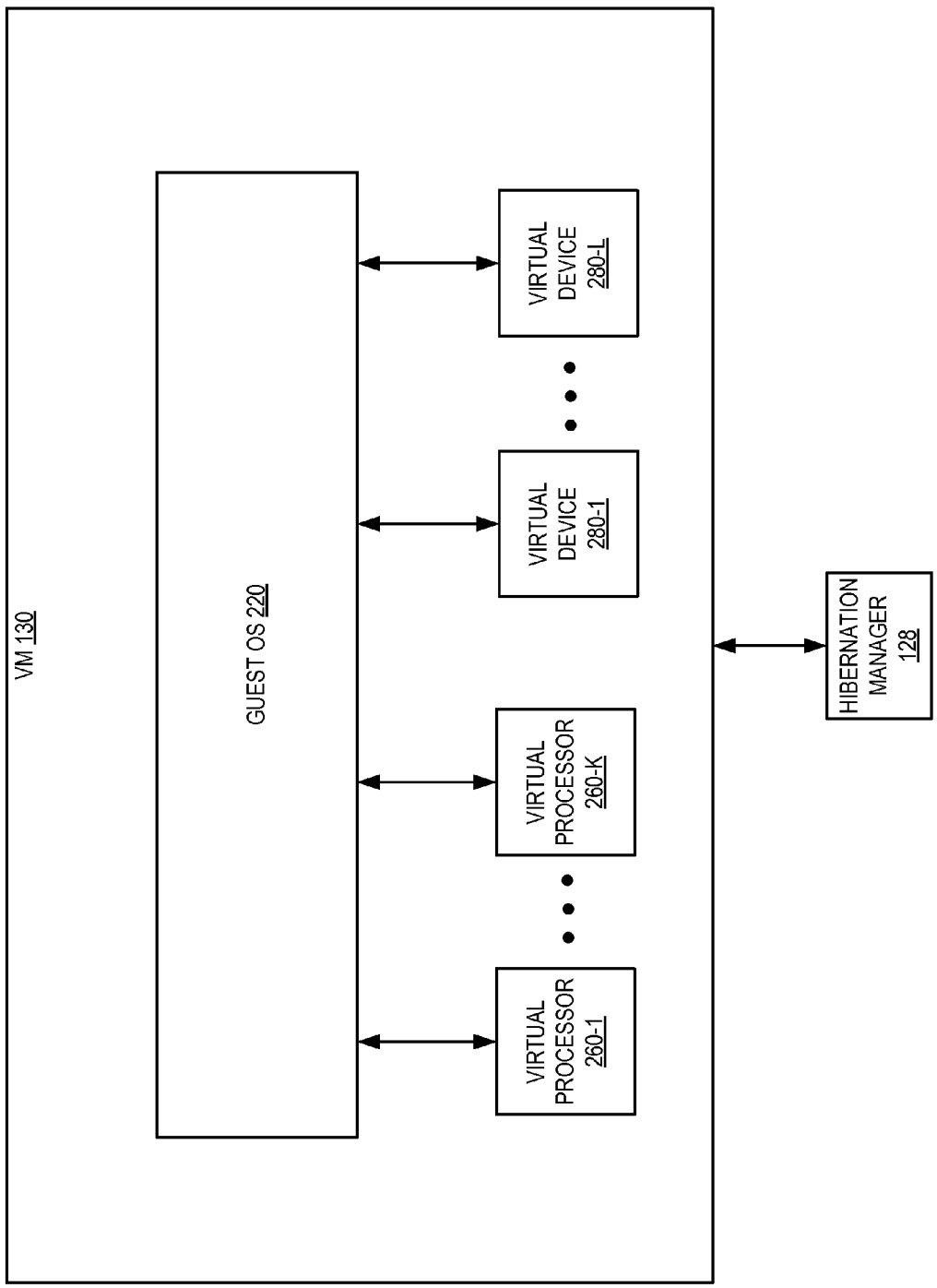
FIG. 2 depicts a block diagram of the salient elements of a virtual machine, in accordance with an embodiment of the present invention.

FIG. 2 depicts a block diagram of the salient elements of virtual machine (VM) 130, in accordance with an embodiment of the present invention. As shown in FIG. 2, virtual machine 130 comprises a guest operating system (OS) 220, one or more virtual processors 260, and one or more virtual devices 280.

Guest operating system (OS) 220 is software that manages computer resources and provides functions such as interprocess communication, scheduling, memory management, and so forth. It should be noted that guest OS 220 may or may not have power management capabilities.

Each virtual processor 260 is software that emulates a physical processor, and that maps to one of central processing units (CPU) 160, possibly in a many-to-one fashion. It should be noted that the number of virtual processors may or may not be the same as the number of CPUs (i.e., K may or may not equal N).

Each virtual device 280 is software that emulates a physical device and that maps to one of devices 180. In one embodiment, the mapping between virtual devices 280 and devices 180 is one-to-one, while in some other embodiments, the number of virtual devices 280 may not be the same as the number of devices 180, and/or the mapping may not be one-to-one. In one embodiment, hypervisor 125 manages these mappings in a transparent fashion, so that guest OS 220 and applications executing on virtual machine 130 interact with virtual processors 260 and virtual devices 280 as though they were actual physical entities.

Hibernation manager 128 is software that is capable of performing blocks 301 through 309 of FIG. 3 below, including hibernating one or more of virtual machines 130-1 through 130-M, and determining when it might be advantageous to hibernate the virtual machines. The functionality of hibernation manager 128 is described in more detail below with respect to FIG. 3.

Figure 3:
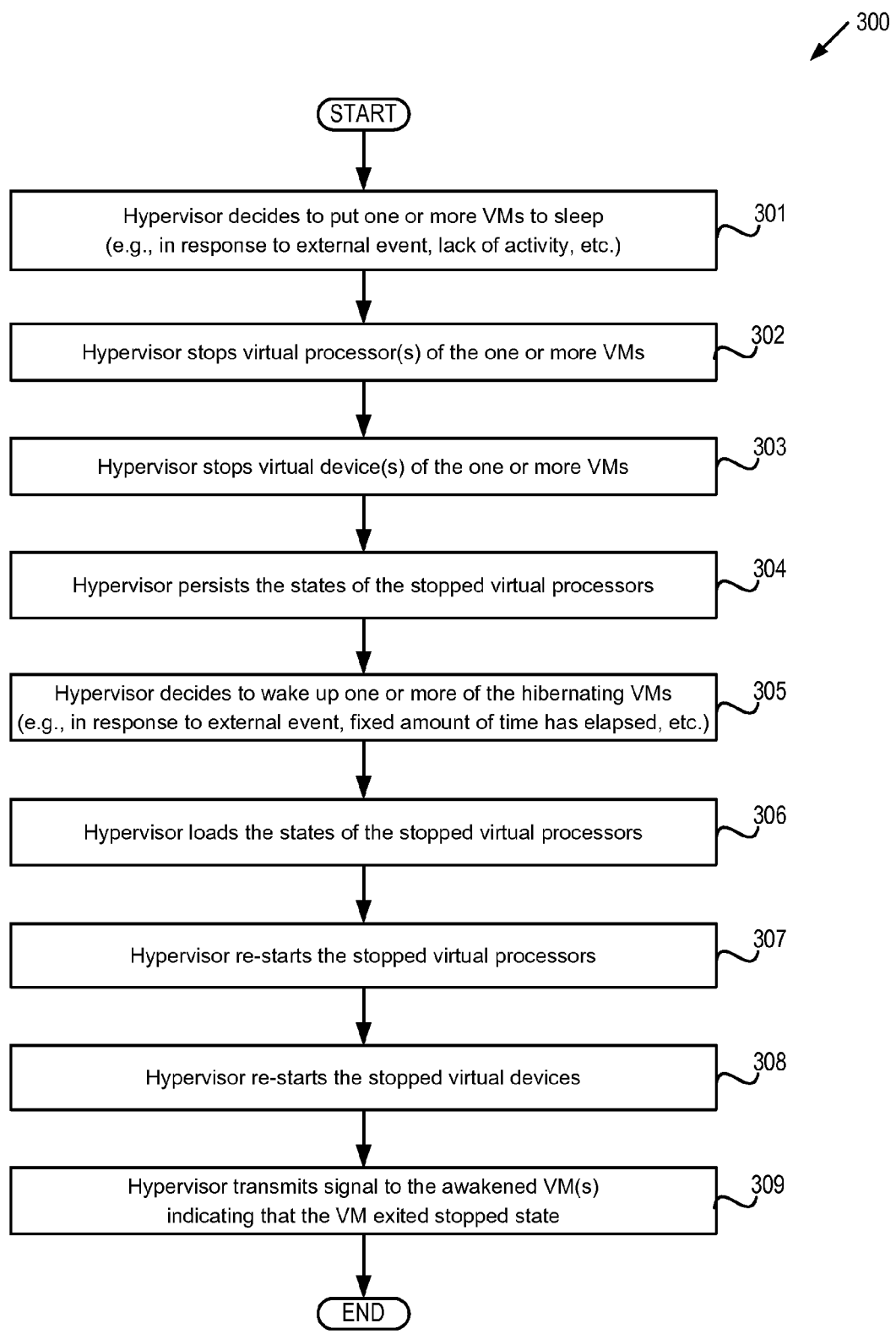
FIG. 3 depicts a flow diagram of one embodiment of a method for managing hibernation of one or more virtual machines via a hypervisor.

FIG. 3 depicts a flow diagram of one embodiment of a method 300 for managing hibernation of virtual machine 130. The method is performed by processing logic that may comprise hardware (circuitry, dedicated logic, etc.), software (such as is run on a general purpose computer system or a dedicated machine), or a combination of both. In one embodiment, the method is performed by the computer system 100 (e.g., hypervisor 125, hibernation manager 128 of hypervisor 125, etc.) of FIG. 1, while in some other embodiments, some or all of the method might be performed by another machine. It should be noted that blocks depicted in FIG. 3 can be performed simultaneously or in a different order than that depicted.

At block 301, hypervisor 125 decides to put one or more virtual machines 130 to sleep, without any prompting or participation in the decision by guest OS 220. This decision by hypervisor 125 may be made for any number of reasons, such as in response to the occurrence of an event external to hypervisor 125 (e.g., a hardware fault, the arrival of an incoming packet, etc.), due to a lack of activity of a virtual machine, and so forth. Hypervisor 125 may make this decision regarding some but not all virtual machines running on the computer system 100. Hypervisor 125 can make this decision based on detecting one of the above events, and without any virtual machine requesting to be put to sleep or to be aware that it is about to be put to sleep.

At block 302, hypervisor 125 stops the virtual processors 260 of the one or more virtual machines 130 that are to be put to sleep. At block 303, hypervisor 125 stops the virtual devices 280 of the one or more virtual machines 130.

At block 304, hypervisor 125 persists (e.g., saves to secondary memory 175, stores in a non-volatile memory [not depicted in the figures], etc.) the states of the stopped virtual processors 260. At block 305, hypervisor 125 decides to wake up one or more of the hibernating virtual machines. This decision may be made for any number of reasons, such as: in response to the occurrence of an event external to hypervisor 125 (e.g., an interrupt, the arrival of an incoming packet, etc.); in response to a clock event (e.g., detecting that the virtual machine spent a fixed amount of time in hibernation, at a fixed time of day, etc.); and so forth. Hypervisor 125 may make this decision regarding some but not all of the hibernating virtual machines on the computer system 100.

At block 306, hypervisor 125 loads the states of the stopped virtual processors 260 that were persisted at block 304. At block 307, hypervisor 125 re-starts the stopped virtual processors 260, and at block 308, hypervisor 125 re-starts the stopped virtual devices 280.

At block 309, hypervisor 125 transmits a signal to the awakened virtual machine(s) indicating that the virtual machine exited a stopped state. It should be noted that block 309 is optional, and that some alternative embodiments may omit this block.

Figure 4:
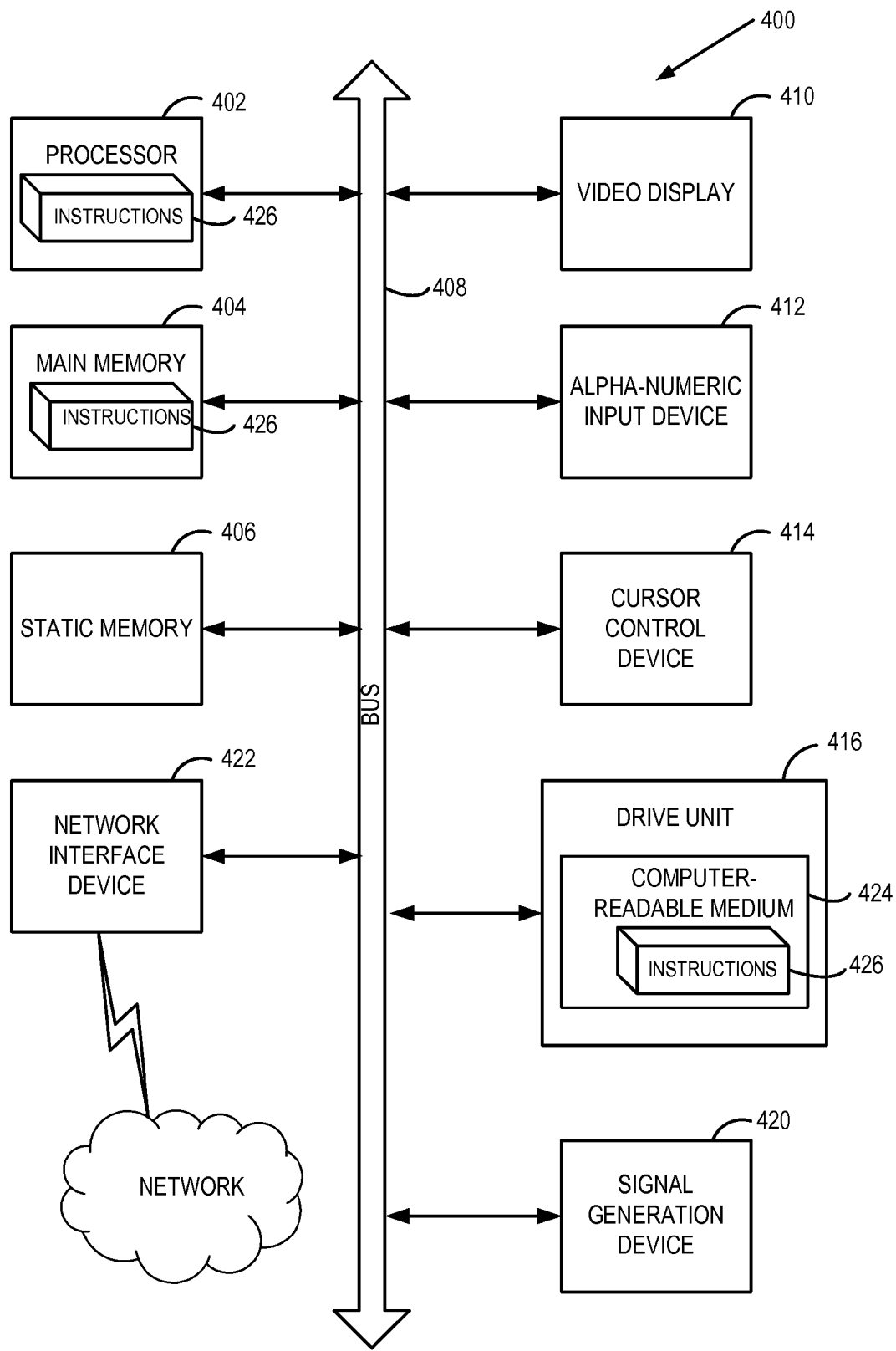
FIG. 4 depicts a block diagram of an illustrative computer system operating in accordance with embodiments of the invention.

FIG. 4 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the method of FIG. 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   executing, by a processing device, a hypervisor;
   identifying a first virtual machine that is executing and a second virtual machine that is executing, the first virtual machine comprising a plurality of virtual processors;
   determining, by the hypervisor, that the first virtual machine is to be hibernated while the second virtual machine remains awake, wherein the determining is performed without involvement of a guest operating system hosted by the first virtual machine;
   stopping by the hypervisor, in view of the determining, a first virtual processor of the plurality of virtual processors of the first virtual machine;
   persisting, by the hypervisor, a state of the stopped first virtual processor; and
   in response to a hardware fault that occurs after the stopping of the first virtual processor and the persisting of the state of the stopped first virtual processor, re-starting, by the hypervisor, the stopped first virtual processor, the re-starting comprising loading the state of the stopped first virtual processor.

2. The method of claim 1 further comprising transmitting to the first virtual machine a signal that indicates that the first virtual machine has exited a stopped state.

3. The method of claim 1 further comprising:
   stopping, by the hypervisor, a second virtual processor of the plurality of virtual processors of the first virtual machine; and
   persisting, by the hypervisor, a state of the stopped second virtual processor.

4. The method of claim 1 further comprising stopping, by the hypervisor, one or more virtual devices of the first virtual machine.

5. An apparatus comprising:
   a memory to store a first virtual machine and a second virtual machine; and
   a processing device, operatively coupled to the memory, to execute the first virtual machine, the second virtual machine, and a hypervisor, wherein the processing device is to execute the hypervisor to:
   identify the first virtual machine and the second virtual machine, the first virtual machine comprising a plurality of virtual processors;
   determine that the first virtual machine is to be hibernated while the second virtual machine remains awake, wherein the determining is performed without involvement of a guest operating system hosted by the first virtual machine;
   stop, in view of the determining, a first virtual processor of the plurality of virtual processors of the first virtual machine;
   persist a state of the stopped first virtual processor; and
   in response to a clock event that occurs after the stopping of the first virtual processor and the persisting of the state of the stopped first virtual processor, re-start the stopped first virtual processor, the re-starting comprising loading the state of the stopped first virtual processor.

6. The apparatus of claim 5 wherein the hypervisor is also to:
   stop a second virtual processor of the first virtual machine; and
   persist a state of the stopped second virtual processor.

7. A non-transitory computer readable storage medium, having instructions stored therein, which when executed, cause a processing device to:
   execute, by the processing device, a hypervisor;
   identify a first virtual machine that is executing and a second virtual machine that is executing, the first virtual machine comprising a plurality of virtual processors;
   stop, via the hypervisor, a first virtual processor of the plurality of virtual processors of the first virtual machine while the second virtual machine remains awake, wherein the first virtual machine hosts a guest operating system that has no power management capability;
   persist, via the hypervisor, a state of the stopped first virtual processor; and
   in response to a hardware fault that occurs after the stopping of the first virtual processor and the persisting of the state of the stopped first virtual processor, re-start, via the hypervisor, the stopped first virtual processor, the re-starting comprising loading the state of the stopped first virtual processor.

8. The non-transitory computer readable storage medium of claim 7, wherein the instructions further cause the processing device to transmit to the first virtual machine a signal that indicates that the first virtual machine has exited a stopped state.

9. The non-transitory computer readable storage medium of claim 7,
   wherein the instructions further cause the processing device to:
   stop, via the hypervisor, a second virtual processor of the plurality of virtual processors of the first virtual machine; and
   persist, via the hypervisor, a state of the stopped second virtual processor.

10. The non-transitory computer readable storage medium of claim 7, wherein the instructions further cause the processing device to stop, via the hypervisor, one or more virtual devices of the first virtual machine.

* * * * *